Sept. 19, 1950     R. P. HANNA ET AL     2,523,112
CONTROL SYSTEM FOR SWITCH DEVICES
Filed July 26, 1947
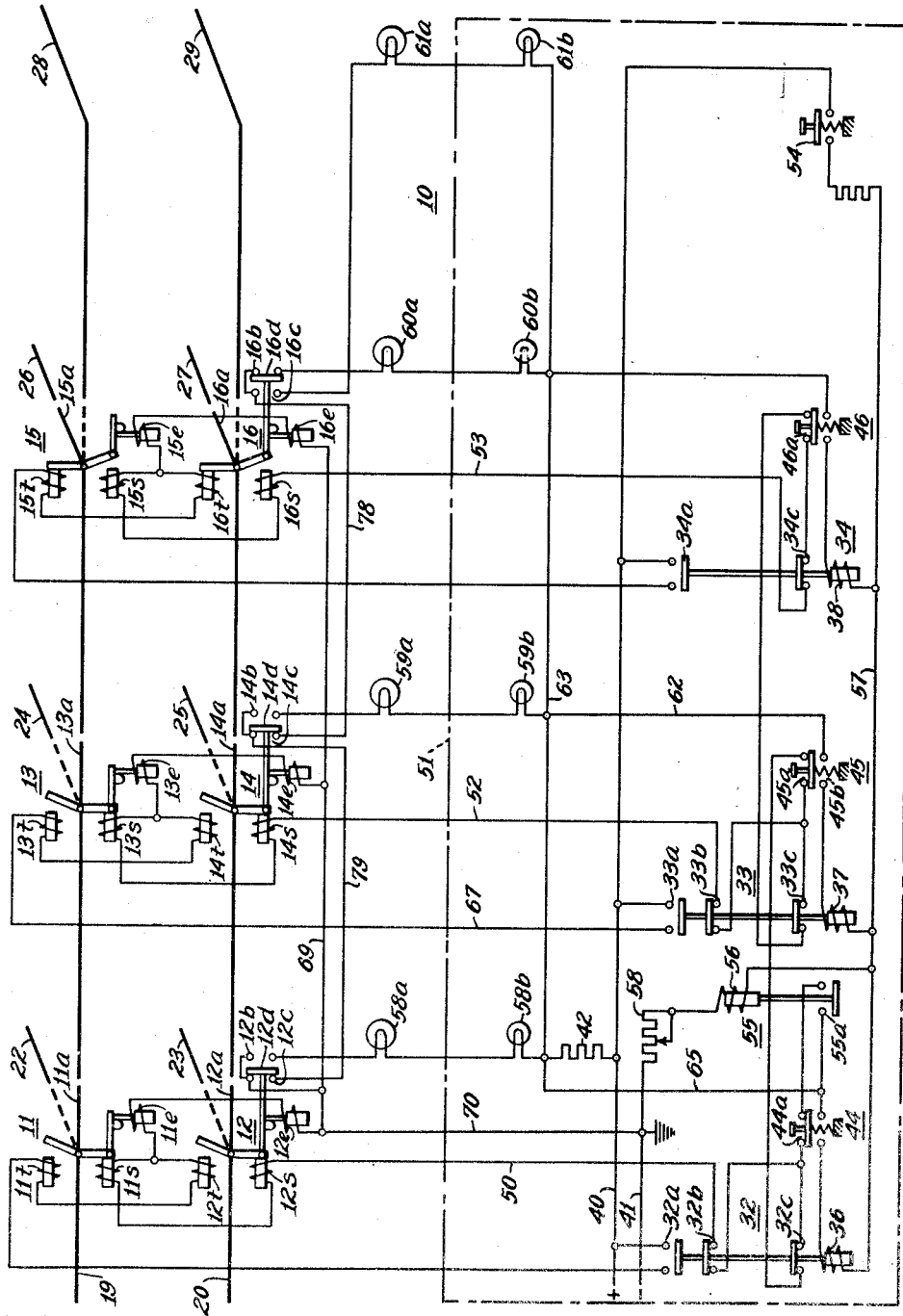
WITNESSES:
Robert C. Baird
G. V. Giolma
INVENTORS
Raymond P. Hanna and
John C. Ponstingl.
BY
G. M. Crawford
ATTORNEY Patented Sept. 19, 1950

2,523,112

UNITED STATES PATENT OFFICE 2,523,112

CONTROL SYSTEM FOR SWITCH DEVICES

Raymond P. Hanna and John C. Ponstingl, Pittsburgh, Pa., assignors to Westinghouse Electric Corporation, East Pittsburgh, Pa., a corporation of Pennsylvania Application July 26, 1947, Serial No. 763,804

10 Claims. (Cl. 191—38)

Our invention relates, generally, to control systems for switch devices, and it has reference, in particular, to a control system for selectively controlling the operation of a group of switch devices, such as electrically-controlled trolley frogs, which may be used in vehicle storage yards and the like.

Generally stated, it is an object of our invention to provide an improved system for selectively controlling the operation of a plurality of electrically-controlled trolley frogs in a vehicle storage yard, which is simple and inexpensive to manufacture, easy to operate and reliable in operation.

More specifically, it is an object of our invention to provide for selectively controlling the operation of a plurality of trolley frogs in a vehicle storage yard, or the like, so as to preselect a path to a particular storage track for a vehicle by a single control operation or selection.

Another object of our invention is to provide, in a trolley frog control system, for selectively operating one of a plurality of serially or sequentially arranged trolley frogs along a main line or conductor to provide an immediate path to one of a number of branch lines or conductors from the main line, and for simultaneously operating those trolley frogs which are located ahead of the selected one along the main line to provide a continuous path from a control point to the operated trolley frog; and for using interlock switches of the trolley frogs for operating signal lights at the trolley frog locations and at the control point to indicate selection of the desired path.

It is also an object of our invention to provide, in a turnout control system for a vehicle storage yard, for selectively operating a particular turnout frog or switch to permit entry to a given line or track, and for simultaneously operating all of the frogs or switches ahead of the one selected to such positions as to provide a continuous path to said given line or track.

Yet another object of our invention is to provide, in a trolley frog control system, for selectively operating any one of a plurality of trolley frogs leading from a main line to branch lines to the "turn" position, so as to provide a path between the main line and the branch line, and, at the same time, for operating the trolley frogs ahead of the selected one to the "straight" position to provide a continuous path along the main line to the selected branch line.

It is an important object of our invention to provide for selectively operating any one of a plurality of trolley frogs in a yard turnout system so as to provide a conductor path from a main line to an associated branch line and, at the same time, to so interrupt an operating circuit common to all of the trolley frogs that only the trolley frogs ahead of the selected frog are operated, thereby to provide a continuous path along the main line up to the selected trolley frog.

Other objects will in part be obvious, and will in part be explained hereinafter.

In practicing our invention in one of its forms, a plurality of electrically-controlled trolley frogs having "straight" and "turn" operating windings are arranged in a yard turnout system so as to connect the trolley conductors of a plurality of successive spaced apart storage or branch tracks to those of a main track. The "turn" windings are selectively energized in response to the operation of individual control switches located at a control point near the entrance to the yard, depending upon which storage track it is desired to turn into. The "straight" operating windings are disposed for energization from a common operating circuit which normally connects the "straight" windings of all of the frogs in parallel circuit relation. This operating circuit includes normally closed contact members selectively actuable in response to operation of their respective control switches, and which are connected in series circuit relation with the connections to their "straight" operating windings, and in the operating circuit following such connections. Accordingly, when the control switch for a particular trolley frog is actuated, that frog is operated to the "turn" position and, at the same time, the common operating circuit is interrupted so that only the trolley frogs ahead of the selected trolley frog are operated to the "straight" position to provide a continuous conductor path along the main track to the conductor of the desired branch track.

For a more complete understanding of the nature and scope of our invention, reference may be made to the following detailed description, which may be read in connection with the accompanying drawing, in which:

The single figure is a diagrammatic view of a turnout control system embodying the invention in one of its forms.

Referring to the single figure of the drawing, the reference numeral 10 may denote, generally, a control system for use in a trolley coach storage yard wherein a plurality of switch devices in the form of electrically-operated trolley frogs, 11, 12, 13, 14, 15 and 16 may be utilized in paired relation to provide paths between a pair of main trolley conductors 19 and 20, and a plurality of associated branch conductors 22, 23, 24, 25, 26, 27, 28 and 29, which are used in connection with a plurality of successive spaced apart storage bays or tracks for storing electrically operated vehicles. While the invention is shown as applied to trolley frogs in a trolley conductor system, it will be apparent that it may be similarly applied to track switches and the like.

Since the trolley frogs may be of any suitable type, and similar in all respects, the detailed description thereof will be limited to the trolley frogs 11 and 12, which are associated with branch conductors 22 and 23, respectively. The corresponding parts of the other frogs will be numbered accordingly.

The trolley frogs 11 and 12 may, for example, comprise movable tongues 11a and 12a which may be disposed in the "straight" position as shown to provide a path along the main conductors 19 and 20, or operated to a "turn" position to provide paths between the main conductors and the branch conductors 22 and 23, respectively. Operation of the movable tongues 11a and 12a may be effected by means of "straight" and "turn" operating windings 11s, 12s and 11t, 12t, respectively. A suitable locking device may be provided in connection with each of the trolley frogs for locking the movable tongue in the position to which it is operated. The locking devices may be provided with operating winding 11e and 12e, respectively. Interlock contact means may be provided in connection with at least one of the trolley frogs of each pair comprising, for example, stationary contact members 12b and 12c with a cooperating movable contact member 12c associated with the trolley frog 12.

Operation of the trolley frogs 11 through 16 to the "turn" position may be effected by means of individual control switches 32, 33 and 34 having operating windings 36, 37 and 38, respectively. The control switches 32, 33 and 34 may be disposed to connect the "turn" operating windings of their respective trolley frogs to a suitable source of electrical energy for operating the trolley frogs to the "turn" position. For example, the control switch 32 may be disposed to connect the "turn" windings 11t and 12t of the frogs 11 and 12 to a source of electrical energy, represented by the control conductors 40 and 41 through normally open contact member 32a. The conductors 40 and 41 may be energized from any suitable source of voltage. A current limiting resistor 42 may be used to limit the current to a safe value, particularly when the conductors 40 and 41 are energized from a 600 volt source such as the trolley conductors 19 and 20. The control switches 33 and 34 may likewise be disposed to connect the "turn" operating windings 13t, 14t, 15t and 16t to the control conductors through contact members 33a and 34a, respectively.

Operation of the control switches may be effected by means of push button switches 44, 45 and 46, which may be individual to the trolley frogs 11 and 12, 13 and 14, and 15 and 16, respectively. The push button switches may be located at a common control point near the entrance to the storage yard, and they may be disposed to connect the operating windings 36, 37 and 38 of the control switches to the control conductors 40 and 41 for selectively operating the switches.

In order to insure a continuous path from the point of entry of the storage yard, which may be represented by the lower ends of the main conductors 19 and 20, to whichever of the pairs of trolley frogs may have been operated to the "turn" position, a common operating circuit may be provided for energizing the "straight" operating windings of the trolley frogs. For example, a common operating circuit may be provided for the "straight" operating windings including a series circuit connection of the normally closed contact members 44a, 45a and 46a of the push button switches 44, 45 and 46, and normally closed contact members 32c, 33c, and 34c of the control switches. The "straight" operating windings 11s and 12s may be connected to this common operating circuit through conductor 50, and the normally closed contact members 32b of the control switches 32.

The "straight" operating windings 13s and 14s may be connected to the common operating circuit in parallel circuit relation by conductor 52 and normally closed contact members 33b. In a like manner, the "straight" operating windings 15s and 16s also may be connected to the common operating circuit in parallel circuit relation with the other "straight" operating windings by conductor 53. Since the trolley frogs 15 and 16 are the last pair, only the contact members 34c of the control switch 34 need be used in circuit relation therewith.

Energization of the common operating circuit may be effected by means of a master switch 55 having an operating winding 56 connected between a common conductor 57 connecting the operating windings of the control switches, and control conductor 41, so as to be in series circuit relation with the parallel arrangement of the windings 36, 37 and 38. The switch 55 connects the common operating circuit to the control conductor 40 through contact members 55a and resistor 42. A resistor 58 may be used to vary the pickup of the master switch. Normally closed contact members 32c, 33c and 34c of the control switches 32, 33 and 34 may be connected in series circuit relation with the normally closed contact members 44a, 45a and 46a of the push button switches to prevent sneak operating circuits through the "straight" operating windings of the succeeding trolley frogs when the "turn" operating windings of any one pair of trolley frogs are energized. A push button switch 54 may be provided for operating the switch 55 to set all of the trolley frogs to the "straight" position should it be desired to use the last storage bay or track represented by the conductors 28 and 29.

Indications of the operating positions of the different trolley frogs may be given by means of indicating lights 58a, 59a, 60a and 61a located at their respective turnouts in the yard, and by indicating lights 58b, 59b, 60b and 61b located at the control point together with the push button switches 44, 45, 46 and 54, respectively. The enclosure 51 may designate that portion of the control system which may be located at the entry or control point of the yard, for example slightly ahead of the first trolley frogs 11 and 12.

As shown, the tongues 15a and 16a of trolley frogs 15 and 16 are actuated to the "turn" position, providing access to the branch conductors 26 and 27. The indicating lamps 60a and 60b are energized through a circuit extending from the positive control conductor 40 through the resistor 42, conductor 63, lamps 60b and 60a, contact members 16b and 16d, conductor 78, contact members 14c and 14d, conductor 79, contact members 12c and 12d, and conductor 70 to the negative control conductor 41.

Should it be desired that a vehicle entering the yard from the direction of the lower end of the main conductors 19 and 20 be transferred to the storage track associated with the branch conductors 24 and 25, for example, the push button switch 45 may be depressed. This completes an energizing circuit for switch 55 and control switch 33, extending from the negative control conductor 41 through resistor 58, through the operating windings 56 and 37 in series circuit relation, contact members 45b of the push button switch 45, conductors 62 and 63, and control resistor 42 to the positive control conductor 40. The control switch operates to connect the "turn" operating windings 13t and 14t to the control conductors 40 and 41, through a circuit extending from the control conductor 40 through contact members 33a, conductor 67, windings 13t, 14t, 13e and 14e, conductor 69, and conductor 70 to the negative or grounded control conductor 41. The movable tongues 13a and 14a of trolley frogs 13 and 14 are, accordingly, operated to the "turn" position.

It will be recalled that, when the operating winding 37 of the control switch 33 was energized, the operating winding 56 of the switch 55 was also energized in series circuit relation therewith. The operation of switch 55 connects the common operating circuit for the "straight" operating windings of the trolley frogs to the positive conductor 40 through its contact members 55a. Accordingly, an energizing circuit is completed for the "straight" operating windings 11s and 12s through the conductor 50, extending from the positive control conductor 40 through resistor 42, conductor 65, contact members 55a, and the normally closed contact members 44a of the common series operating circuit.

Since the push button switch 45 has been depressed, this series operating circuit is interrupted at contact members 45a. Also, since the control switch 33 has been energized, the series operating circuit is further interrupted at its contact members 33c, and the connection of conductor 52 thereto interrupted at contact members 33b. Accordingly, the "straight" operating windings of the trolley frogs 13 and 14 remain deenergized, as do those of the trolley frogs 15 and 16 and any other trolley frogs located further along the main conductors 19 and 20. Thus, the trolley frogs 15 and 16 remain in the "turn" position since they too are beyond the selected trolley frogs 13 and 14 and their "straight" operating windings remain deenergized.

When the trolley frogs 13 and 14 are actuated to the "turn" position, the signal lights 59a and 59b will be energized through a circuit extending from the positive control conductor 40 through control resistor 42, conductor 63, lamps 59b and 59a in series, contact member 14b, conductor 79, contact members 12c and conductor 70 to the negative control conductor 41. Accordingly, only the signal lamps 59a and 59b will be lighted to indicate that the trolley frogs 13 and 14 have been operated to the "turn" position, and that all the previous trolley frogs between them and the point of entry are in the "straight" position to provide a continuous path from the point of entry to the selected branch track or storage bay. The lamps 60a and 60b, which were previously lighted, are extinguished upon operation of the trolley frogs 13 and 14 since their energizing circuit is now interrupted at contact members 14c and 14d.

From the above description and the accompanying drawing, it will be apparent that we have provided a trolley frog control system for storage yards and the like, wherein a plurality of serially or sequentially arranged trolley frogs may be selectively operated to provide a continuous path to a desired branch line or track in a single operation. Since a common operating circuit is provided for all of the "straight" operating windings and this circuit is positively interrupted, both immediately ahead of and following the trolley frog which is selectively operated, selection of a particular trolley frog or pair of trolley frogs automatically results in the establishment of a continuous path from the point of entry to the selected trolley frog or trolley frogs. Since the individual connection to the "straight" operating windings of the selected trolley frogs are also interrupted, false operations are eliminated. A control system embodying our invention is easy to operate since only a single operation is required and positive indication of the correct operation is assured at all times. Since different track arrangements may be used having several branch conductors leading off from a sub-branch conductor connecting to a main conductor, it will be realized that the terms "straight" and "turn" are merely relative and may be used in different senses in different parts of a system. The term "straight" may, for example, be used to identify the path to any following or succeeding tracks or conductors, while the term "turn" may be used to identify the path to the track or conductor which is the one selected.

Since certain changes may be made in the above-described construction and different embodiments of the invention may be made without departing from the spirit and scope thereof, it is intended that all the matter contained in the description and shown in the accompanying drawing shall be considered as illustrative and not in a limiting sense.

We claim as our invention:

1. In a control system for a plurality of electrically-controlled switch devices providing connections between an entry point on a main line and a plurality of branch lines, control means associated with each switch device connected for selectively operating said switch device to provide a connection to an associated branch line and preventing operation of the switch device of any branch line on the other side of the selected switch device from the entry point, and circuit means including a control relay common to all of the switch devices controlled by the control means connected to selectively operate others of the switch devices intermediate the entry point and said one switch device to provide a path between the entry point and said one switch device.

2. In a control system for a plurality of electrically-controlled switch devices in a vehicle storage yard having a main line with a plurality of branch lines successively spaced along the main line from a control point for providing paths to different ones of the branch lines from the main line, circuit means associated with each switch device including control means at the control point associated with said switch device, said circuit means and control means being connected to energize an associated switch device to provide a path from the main line to the associated branch line, and additional circuit means including a single control relay connected by the control means to energize simultaneously the switch devices between the control point and said associated switch device to provide a path between the control point and said associated switch.

3. A control system for a plurality of electrically-controlled switch devices arranged in cascade and each actuable to one position to provide a path along a main line and actuable to another position to provide a path onto a branch line comprising, circuit means including a single control switch individual with each switch device connected to effect selective operation of the switch device to provide a path onto its associated branch line, contact means responsive to operation of each control switch, and additional circuit means including a master switch common to all of the switch devices except the first one, and said contact means connected to effect operation of each of the switch devices ahead of the selected switch device excepting said first one to provide a path along the main line.

4. In a switching system for a plurality of electrically-controlled trolley frogs disposed at spaced intervals along a main conductor and operable to one position to provide a continuous path along the main conductor and operable to another position to provide a path from the main to a branch conductor, circuit means including switch means individual to each of the branch lines and operable to provide energizing circuits for selectively operating only the trolley frog to which the switch means is individual to provide a path from the main conductor to the associated branch line, and circuit means including contact means and a common master switch operable in response to operation of any one of the switch means to provide an energizing circuit for operating said trolley frogs to provide a path along the main conductor, said circuit means including normally closed contact means opened in response to operation of said one switch means to interrupt said operating circuit and prevent energizing the selected trolley frog to provide a path along the main conductor.

5. In a switching system for a plurality of trolley frogs disposed in predetermined sequence along a main conductor to provide connections with associated branch conductors, a control switch individual to each branch conductor operable to effect operation of its associated trolley frog to provide a path from the main conductor to the branch conductor, circuit means providing a parallel energizing circuit for operating the trolley frogs to provide a path along the main conductor, said circuit means including normally closed contact means of said control switch interposed in series circuit relation ahead of the associated trolley frog, and control means including a common master switch responsive to operation of the control switch operable to energize said circuit means.

6. A control system for a plurality of electrically-controlled trolley frogs each associated with a branch conductor for providing connections between a main conductor and said branch conductors which are arranged in spaced relation in sequence along the main conductor comprising, switch means individual to each trolley frog for providing an operating circuit to selectively actuate the frog to provide a path from the main conductor to the branch conductor associated with the frog, control means including a single control switch individual to each trolley frog for effecting operation of the switch means associated therewith, said control means having normally closed contact means, a common master relay responsive to operation of any one of the control means, and circuit means including said master relay and normally closed contact means providing a control circuit for operating the trolley frogs ahead of the selected one in said sequence to provide a path along the main conductor to the selected trolley frog.

7. In a control system for a plurality of electrically-controlled trolley frogs disposed along a main trolley conductor at spaced intervals to provide paths between the main conductor and associated branch conductors, said frogs each having operating windings for operating the frogs in opposite directions to provide paths either along the main conductor or between the main and branch conductors, switch means individual to each trolley frog for energizing one operating winding of said frog to operate the frog to provide a path between the main conductor and the associated branch conductor, control means individual to each switch means operable to effect operation of said switch means, said control means including normally closed contact members, a common operating circuit for the other operating windings of the trolley frogs including said normally closed contact members connected to interrupt said circuit immediately ahead of the connection of said other operating winding of the associated frog, and circuit means responsive to operation of one of said switch means for energizing the common operating circuit up to the point of interruption.

8. In a switching system, a plurality of electrically-controlled trolley switch devices arranged to provide paths between a main trolley conductor and different ones of a plurality of branch trolley conductors disposed in spaced relation along the main conductor, switch means individual to each trolley device operable to effect operation of said trolley device in one direction, control means operable to selectively operate the switch means, said control means having normally closed contact members, an energizing circuit common to the trolley devices for operating them in the other direction, said circuit including said normally closed contact members arranged in series circuit relation immediately in advance of the respective trolley device, an auxiliary switch means connecting said circuit to a source of electrical energy including contact means responsive to operation of one of said control means.

9. In a switching system for a vehicle storage yard having a main line with a plurality of branch lines disposed in sequence therealong in spaced relation, a switch device associated with each branch line having main and branch operating windings energizable to actuate the switch device to provide a path either along the main line or between the main line and a branch line, switch means individual to each switch device operable to provide an energizing circuit for the operating winding actuating the switch device to provide a path between the main line and the associated branch line, a manual control switch individual to each switch means actuable to effect the operation thereof, said manual control switch having normally closed contact members, circuit means connecting the other operating windings in parallel circuit relation, said circuit means including the normally closed contact members of the control switch associated with each of the switch means in series circuit relation in advance of the connection of the other operating winding of the switch means, and a control switch operable with the selected switch means to connect the circuit means to a source of electrical energy.

10. In a control system, a plurality of trolley frogs operable to different positions to connect a plurality of branch conductors either to a main conductor or to provide a path along the main conductor, said trolley frogs having auxiliary switches actuable to either of two positions depending upon the positions of their associated trolley frogs, a push button switch individual to each trolley frog at a control station, a control switch individual to each trolley frog responsive to operation of its associated push button switch to effect energization of its associated trolley frog to connect its branch conductor to the main conductor, a common operating circuit for energizing the trolley frogs to provide a continuous path along the main conductor, switch means connected in circuit with the control switches operable to energize the common operating circuit, contact means responsive to operation of each switch means operable to interupt the operating circuit at the selected trolley frog, and indicating means at the control station and adjacent each trolley frog connected to a source of electrical energy through said auxiliary switches to indicate operation of the trolley frogs to provide a continuous path along the main conductor to the desired branch conductor.

RAYMOND P. HANNA.
JOHN C. PONSTINGL.

REFERENCES CITED

The following references are of record in the file of this patent:

UNITED STATES PATENTS

| Number | Name | Date |
|---|---|---|
| 1,860,661 | Dixon | May 31, 1932 |

FOREIGN PATENTS

| Number | Country | Date |
|---|---|---|
| 408,348 | France | Oct. 27, 1909 |